UNITED STATES PATENT OFFICE 2,510,428

BACTERICIDAL AND BACTERIOSTATIC PREPARATIONS COMPRISING 2,3-DI-ARYL INDOLES

John H. Standen, Yonkers, N. Y., assignor to The B. F. Goodrich Company, New York, N. Y., a corporation of New York No Drawing. Application May 18, 1948, Serial No. 27,824

2 Claims. (Cl. 167—33)

This invention relates to new and useful improvements in bactericidal and bacteriostatic preparations, particularly preparations adapted to devitalize or render innocuous such pathogenic bacteria as Staphylococcus aureus, Escherichia coli, Streptococcus pyogenes and Mycobacterium tuberculi.

I have discovered that certain 2,3-diaryl indoles possess remarkable bactericidal and bacteriostatic activity even when present in very low concentrations such as 1 to 100 parts per million, and that the activity persists over a considerable temperature range. The 2,3-diaryl indoles which I have found to possess this activity have the chemical structure

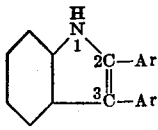

wherein Ar is an aryl hydrocarbon radical of the benzene series such as phenyl, tolyl, xylyl, cumyl, etc. They may be made by the condensation of aniline with a compound of the structure

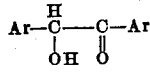

according to the equation:

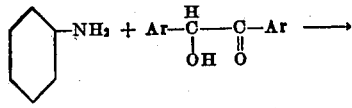

For example, 2,3-diphenyl indole, the compound preferably used in this invention, can be prepared by the condensation of benzoin and aniline in the presence of zinc chloride as described in German Patent 574,840.

It is quite surprising that these 2,3-diaryl indoles possess marked bactericidal activity inasmuch as it has been reported in the literature that bacteria belonging to Escherichia, Aerobacter, and Staphylococcus genera are most resistant to the parent unsubstituted indole,

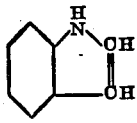

The following specific examples illustrate the bactericidal and bacteriostatic activity of 2,3-diaryl indoles.

EXAMPLE I

Varying amounts of 2,3-diphenyl indole were added to 10 ml. portions of nutrient broth (Difco) and each portion inoculated with Staphylococcus aureus. The test samples were incubated for 24 hours at 40° C. (fever heat). After the incubation period, the treated broth samples were examined to determine bacterial growth. The results of this test are tabulated below in Table I.

Table I 2,3-DIPHENYL INDOLE IN NUTRIENT BROTH

| Concentration P. P. M. | Growth of Staphylococcus aureus 24 hours at 40° C. |
|---|---|
| 1000 | None. |
| 100 | Do. |
| 10 | Do. |
| 1 | Do. |
| 0.1 | Some. |
| 0 | Good. |

EXAMPLE II 2,3-diphenyl indole was also employed against Staphylococcus aureus, Escherichia coli, and Mycobacterium tuberculi in agar plate tests. In these tests, 2,3-diphenyl indole was dissolved in alcohol and the alcohol solution was dispersed in sufficient water to give the desired concentration. This aqueous dispersion was employed to prepare the agar (Difco nutrient agar) which was poured into sterile Petri dishes, the agar and dishes were sterilized by autoclaving, and the agar was inoculated with the bacteria. The dishes containing inoculated agar were incubated for 3 days at temperatures from 21° C. to 40° C. Untreated, autoclaved agar inoculated with these bacteria were also incubated as a check on the growth activity of the bacteria. The results obtained are shown in the following Tables II, III and IV:

Table II 2,3-DIPHENYL INDOLE IN AGAR

[Growth of Staphylococcus aureus—3 day incubation]

| Dairyl Indole Concentration, P. P. M. | Incubation Temp. °C. | Bacteria Growth |
|---|---|---|
| 10 | 21 | None. |
| 1 | 21 | Do. |
| 0 | 21 | Good. |
| 10 | 37 | None. |
| 0 | 37 | Excellent. |
| 10 | 40 | None. |
| 1 | 40 | Do. |

Table III

2,3-DIPHENYL INDOLE IN AGAR

[Growth of *Escherichia coli*—3 day incubation]

| Diaryl Indole Concentration, P. P. M. | Incubation Temp. °C. | Bacteria Growth |
|---|---|---|
| 10 | 21 | None. |
| 1 | 21 | Do. |
| 0 | 21 | Good. |
| 10 | 37 | None. |
| 1 | 37 | Do. |
| 0 | 37 | Excellent. |
| 10 | 40 | None. |
| 1 | 40 | Trace. |
| 0 | 40 | Excellent. |

Table IV

2,3-DIPHENYL INDOLE IN AGAR

[Growth of *Mycobacterium tuberculi*—3 day incubation]

| Diaryl Indole Concentration, P. P. M. | Incubation Temp. °C. | Bacteria Growth |
|---|---|---|
| 10 | 21 | None. |
| 1 | 21 | Trace. |
| 0 | 21 | Good. |
| 10 | 37 | None. |
| 0 | 37 | Excellent. |
| 10 | 40 | None. |
| 1 | 40 | Do. |
| 0 | 40 | Good. |

The data in the tables above clearly demonstrate the remarkable effectiveness of 2,3-diphenyl indole as a bactericide at concentrations as low as one P.P.M. and at temperatures ranging from 21 to 40° C. Other 2,3-diaryl indoles such as the 2,3-ditolyl indoles can be employed in the same manner and in the same concentrations as described above with substantially the same results. It will be understood that higher concentrations of the active agent are also effective and may be employed, if desired, although use of as little active agent as is effective is ordinarily to be preferred for economic reasons.

This invention also contemplates the control of bacteria with 2,3-diaryl indoles in various other ways including the application of the diaryl indole to bacteria wherever present and the incorporation of the diaryl indole in substances and materials which normally support and nourish such growth. For example, these compounds may be employed as bactericides in cosmetics such as hand creams, face creams, shaving creams, soaps, and the like where oily materials that will nourish bacteria are normally present. In addition, they may be used as bactericides in compositions containing proteinous materials. The 2,3-diaryl indoles may also be used to disinfect cutlery, china ware and any utensil used in the preparation of food. They may also be used to disinfect tools, instruments, floors, walls, beds, furniture and the like.

The 2,3-diaryl indoles can be applied to bacteria as aqueous solutions where the solubility will permit the formation of such solutions having a toxic concentration or they may be employed as aqueous dispersions either with or without a wetting agent. Similarly, the diaryl indole can be applied as a solution in a suitable solvent such as acetone or alcohol. The diaryl indoles may also be dispersed in oils, fats and greases to be applied in a protective film or lotion or may be incorporated in such finely-divided solids as for example talc, clays, zinc oxide, corn starch, and the like. In short, the 2,3-diaryl indole may be dispersed, dissolved or otherwise uniformly associated with a major proportion of a carrier medium to obtain bactericidal and bacteriostatic preparations and compositions of wide utility in controlling bacterial growth. Such preparations and compositions will contain a concentration of the diaryl indole sufficient to prevent bacterial growth but the concentration will in general be less than 5% by weight of the entire preparation.

Having disclosed specific examples of my invention, I do not desire or intend to limit myself solely thereto for, as hitherto stated, the concentrations of active ingredients may be varied or the medium carrying the active ingredient may be varied if desired without departing from the spirit and scope of my invention as defined in the appended claims.

I claim:

1. A bactericidal and bacteriostatic preparation comprising as an essential active ingredient from 1.0 part per million to 5% by weight 2,3-diphenyl indole uniformly associated with a carrier medium inactive to bacteria.

2. A bactericidal and bacteriostatic preparation comprising from 1.0 part per million to 5% by weight of 2,3-diphenyl indole dispersed in water.

JOHN H. STANDEN.

REFERENCES CITED

The following references are of record in the file of this patent:

FOREIGN PATENTS

| Number | Country | Date |
|---|---|---|
| 574,840 | Germany | Apr. 20, 1933 |

OTHER REFERENCES

Chem. Abstracts, vol. 41, page 3576a (1947).